United States Patent [19]
Butler et al.

[11] Patent Number: 5,235,629
[45] Date of Patent: Aug. 10, 1993

[54] APPARATUS FOR TELEPHONE LINE CHECKING

[75] Inventors: Myron C. Butler, Edmond, Okla.; Lawrence O. Hilligoss, Ashland, Oreg.

[73] Assignee: Communications Manufacturing Company, Los Angeles, Calif.

[21] Appl. No.: 819,282

[22] Filed: Jan. 13, 1992

[51] Int. Cl.[5] .............................................. H04M 3/28
[52] U.S. Cl. ........................................ 379/21; 379/29; 379/30; 379/15; 379/24
[58] Field of Search ....................... 379/27, 21, 29, 30, 379/31, 15, 24, 26

[56] References Cited

U.S. PATENT DOCUMENTS 4,945,554  7/1990  Krause et al. ........................... 379/15

Primary Examiner—Stafford Schreyer
Attorney, Agent, or Firm—Dougherty, Hessin, Beavers & Gilbert

[57] ABSTRACT

The equipment includes a front panel with LED indicators, key pad and a number of special function keys as well as an LCD message printout and volt/ohm meter. A hand set is readily available at the front panel as the line check unit functions with a commercially available craft terminal, a CMC Type 7910D terminal known as DATASTAR TM, which includes the master central processing unit and random access memory for interactive function with the line check system. The DATASTAR TM unit communicates directly with a controller section that includes speaker power amp, LCD circuitry and 128K random access memory as well as a digital bus interface. The controller board is then connected through both a digital bus and an analog signal bus to an analog circuitry that includes relay control and various signal routing and test signal functions. The analog circuitry is then in communication with the volt/ohm meter and analyzer circuitry.

11 Claims, 16 Drawing Sheets

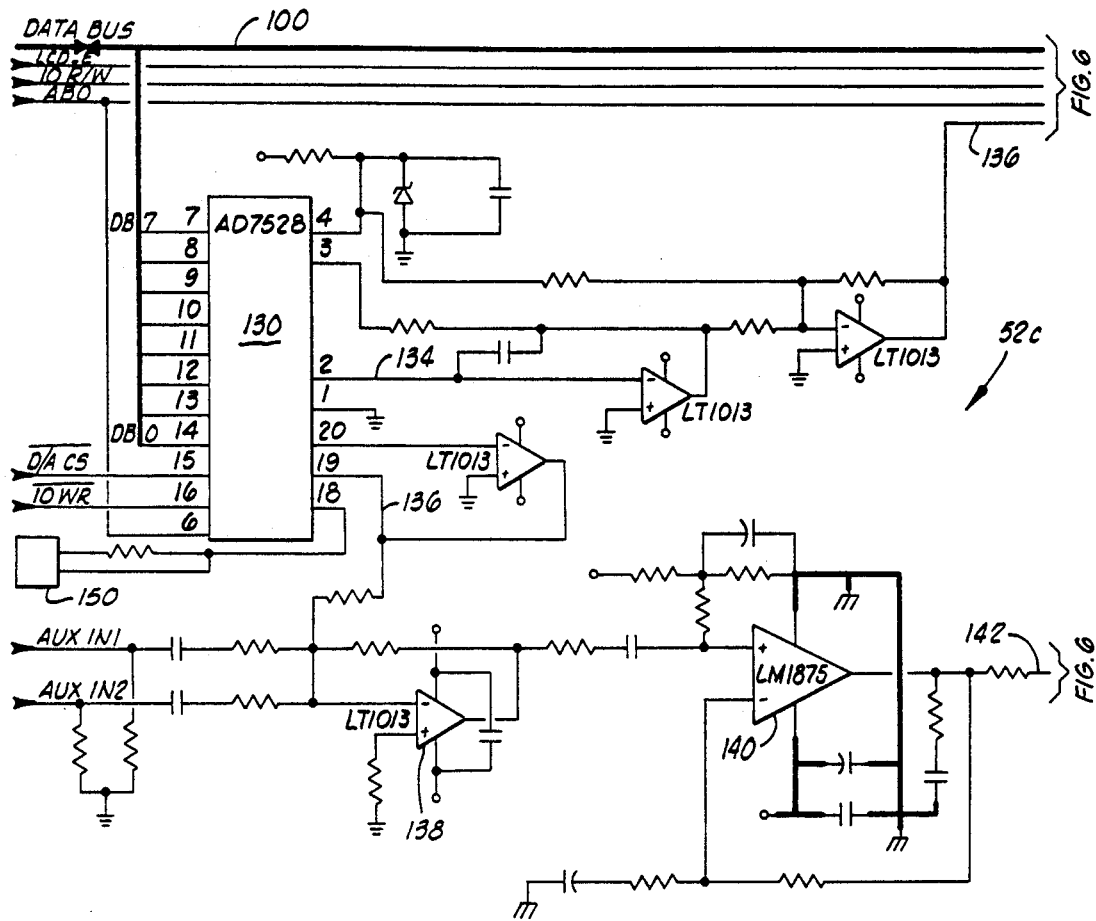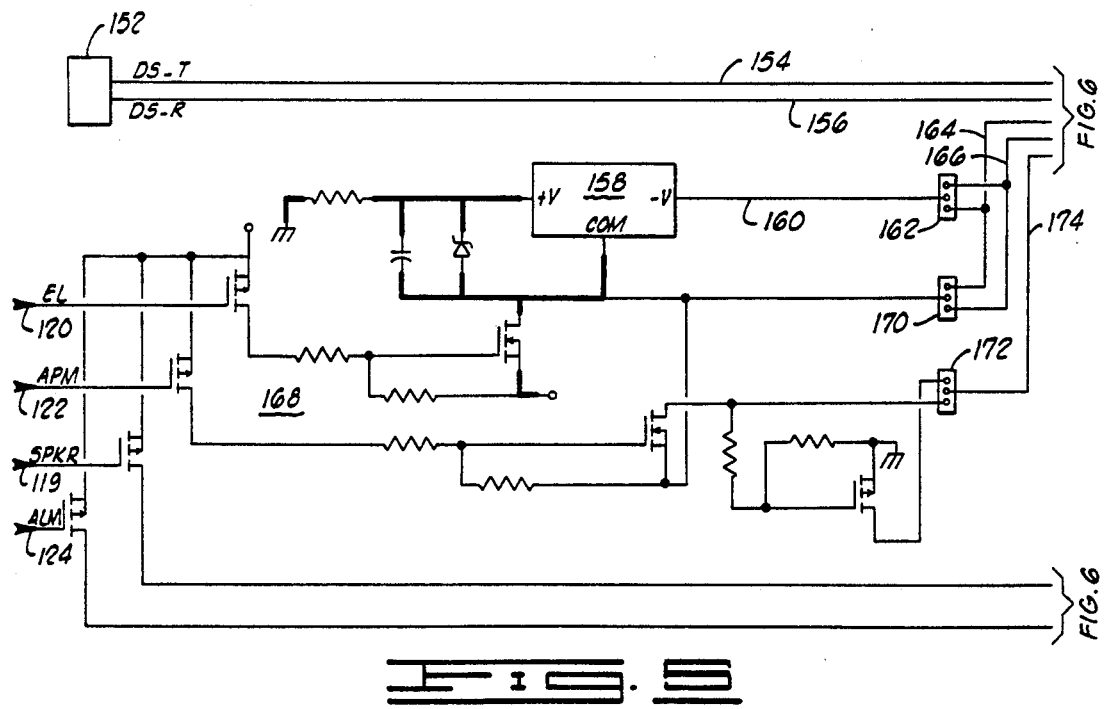
FIG. 5

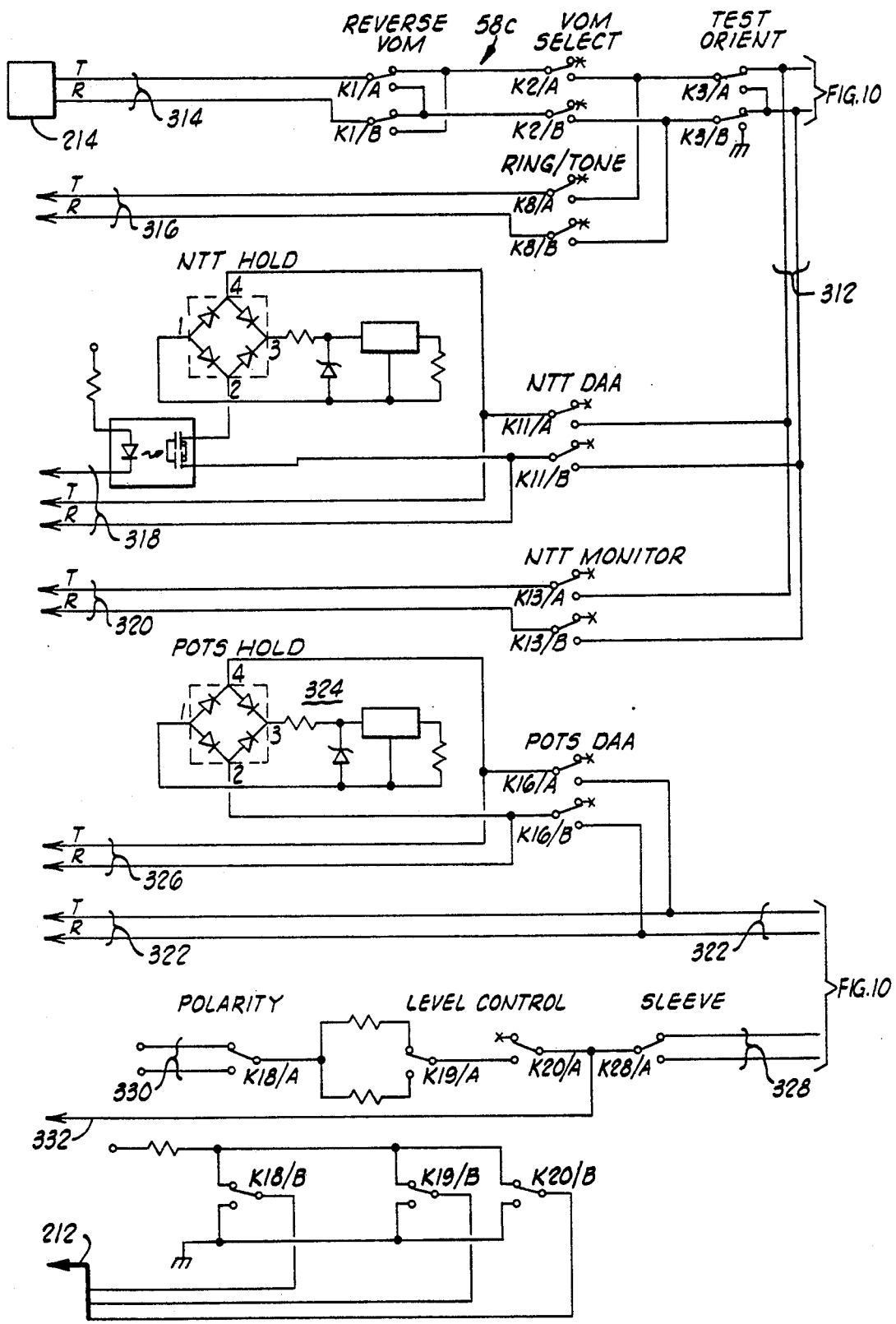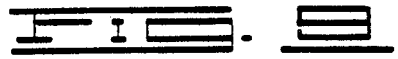

APPARATUS FOR TELEPHONE LINE CHECKING

BACKGROUND OF THE INVENTION

1. Field of the Invention

The invention relates generally to telephone line check systems and, more particularly, but not by way of limitation, it relates to a system for performing line check of such as community dial offices that presently have only limited means for checking.

2. Description of the Prior Art

There are included in the prior art numerous types of telephone testing systems as they have been devised over the years for adaptation to the various telephone switching systems. More recently, specific centralized test systems such as the Model MLT-1 and MLT-2 developed by American Telephone & Telegraph Co. have found large application for mechanized loop testing of latter day telephone switching systems.

There still remain in this country a large number of small class 5 step-by-step offices that are commonly referred to as "community dial offices" (CDO). Such exchanges are usually unattended and maintained by roving technicians as necessitated by trouble occurrences, and while these exchanges are scheduled for replacement by digital equipment within the next decade, there will be little or no automated testing in the meantime. For the most part the Model MLT remote systems are prohibitive on economic $30,000.

The need for a low cost device that will provide craft technician access to cable pairs terminating on main distribution frames in these types of small telephone offices is extant today. A presently available device is the DATU unit available from Harris-Dracon Division. The DATU equipment is capable of performing varied ones of the requisite test functions that are needed in a community dial office environment. Another form of test equipment that is presently available is the Series 3703 Local Cabinet that is manufactured and distributed by Northern Telecom. Finally, a test system interface for telephone loop maintenance and performing isolated ones of the requisite tests is produced by Ericsson GmbA of Sweden. While these various commercially available test units can function to provide isolated ones of the access and testing procedures, there is a need for an equipment of much reduced expense and having multiple capabilities that will allow a craftsperson to quickly verify that telephone line connections are correct and in good order in and about a rural community dial office environment.

SUMMARY OF THE INVENTION

The present invention is a telephone line check system for performing local and remote testing of community dial office switching systems. The line check system is capable of local test trunk access, coin control and MF signaling, remote test trunk access, remote craft technician access of all test-trunk features and the testing of subscriber lines utilizing dial-up links to communicate in ASCII or speech to a dumb terminal.

The equipment includes a front panel with LED indicators, key pad and a number of special function keys as well as an LCD message printout and volt/ohm meter. A hand set is readily available at the front panel as the line check unit functions with a commercially available craft terminal, a CMC Type 7910D terminal known as DATASTAR TM, which includes the master central processing unit and random access memory for interactive function with the line check system. The DATASTAR TM unit communicates directly with a controller section that includes speaker power amp, LCD circuitry and 128K random access memory as well as a digital bus interface. The controller board is then connected through both a digital bus and an analog signal bus to analog circuitry that includes relay control and various signal routing and test signal functions. The analog circuitry is then in communication with the volt/ohm meter and analyzer circuitry.

Therefore, it is an object of the present invention to provide a less expensive line check system that is suitable for use in unmanned community dial offices.

It is also an object of the present invention to provide a line check unit that functions interactively with a battery-powered microprocessor-controlled data terminal to carry out requisite telephone line testing.

Finally, it is an object of the present invention to provide a line check system that provides capabilities for checking telephone lines and switching apparatus, including as follows: simplified checking for pair balance and distance; ability to check the foreign EMF; ability to check for ground; ability to draw dial tone from the equipment; ability to dial into various office test terminations; ability to signal in DTMF or Dial Pulse modes; ability to check resistance; compatibility with all conventional single pair test shoes traditionally available and in use in switching offices; and compatibility with all fifty-two types of headsets as well as those with Type 359 B plugs that are commonly in use.

Other objects and advantages of the invention will be evident from the following detailed description when read in conjunction with the accompanying drawings that illustrate the invention.

BRIEF DESCRIPTION OF THE DRAWINGS

FIGS. 3, 4, 5 and 6 are the interconnected schematic diagram of the controller circuit board;

FIGS. 7, 8, 9, 10, 11 and 12 are the interconnected schematic diagram of the analog circuit board.

DETAILED DESCRIPTION OF THE INVENTION

Figure 1:
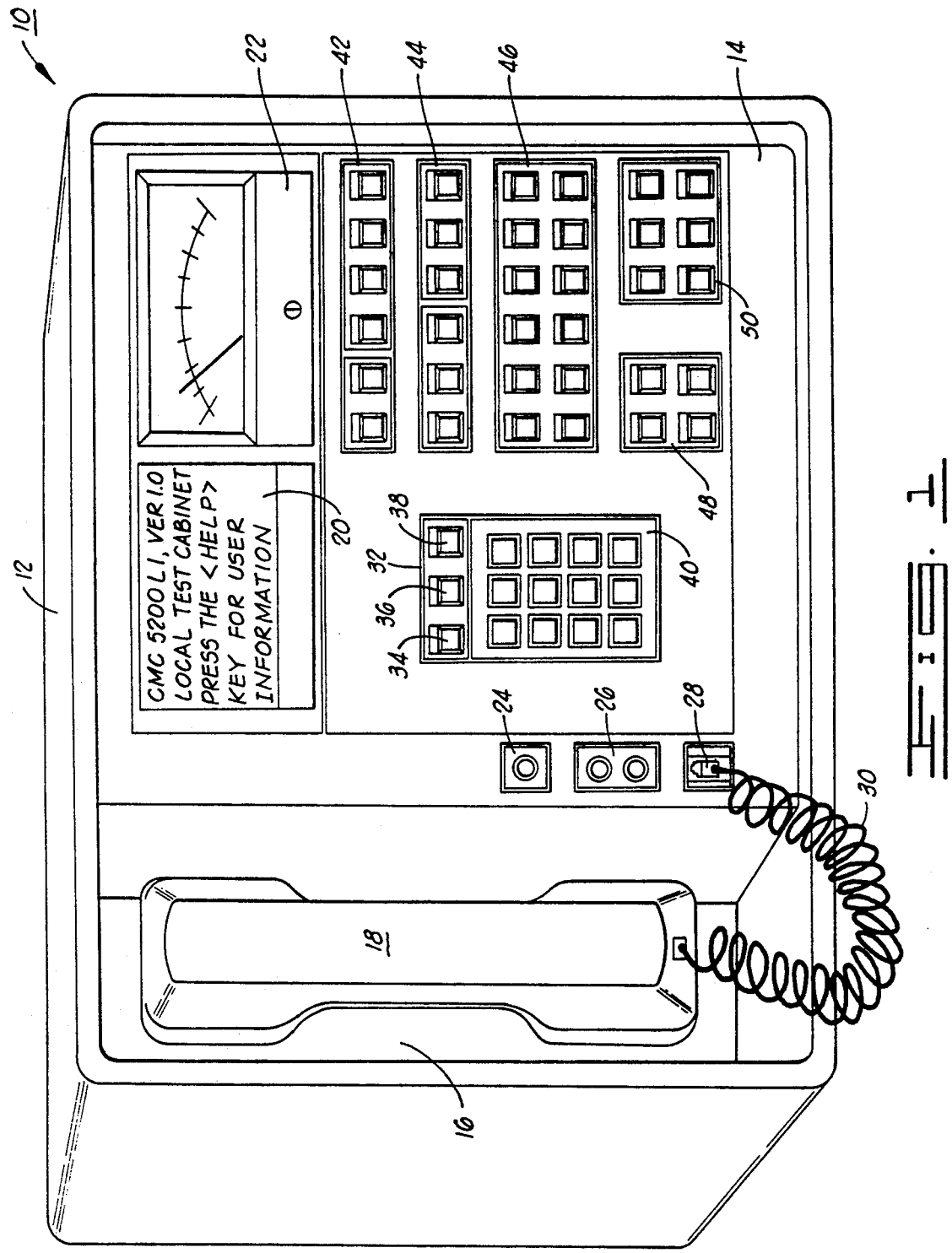
FIG. 1 is a depiction of the front panel of the line check unit.

Referring to FIG. 1, a line check unit 10 includes a suitable cabinet 12 with front panel 14 and compartment 16 for hanging a handset 18. The front panel 14 includes a liquid crystal display 20, e.g., a 4×20 LCD of commercially-available type, and there is also included an analog panel volt/ohm meter 22. A type 310 jack 24 is provided for external test while a double jack 26 provides a headset connection. A standard handset connector 28 then provides connection for cable 30 and handset 18 as it may be conveniently hung within the compartment 16.

A dial pad 32 provides dial control via push buttons 34 for dial pulse (DP), 36 for DTMF and 38 for MF, i.e., 2/6 multi-frequency. A conventional twelve button keypad 40 then provides alphanumeric selection. There are then a number of function buttons on the right hand side of the panel 14 such as the line/trunk access buttons 42 which provide from left to right; TELEPHONE, HOLD, ACCESS, MDF, POTS and REL. A next line of buttons 44 allow selection of test direction and these buttons control functions as OUT, IN, BRDG, TIP-RING, TIP-GROUND and RING-GROUND. A next double row of control buttons 46 provide TEST FUNCTIONS as follows: (left to right, top row) LOOP ST, MONITOR, RING, VOLTAGE, OHMS, and MUL; and the bottom row controls GROUND, TALK, TONE, KICK, EXTERNAL TEST and SPEAKER ON/OFF. Control buttons 48 provide selection of LOOP CONDITION such as REVERSE TIP-RING, SHORT TIP-RING, GROUND TIP and GROUND RING conditions, and button pad 50 is reserved for operating unit functions such as HELP, PAGE UP, ALT, ESCAPE, PAGE DOWN and MENU.

Figure 2:
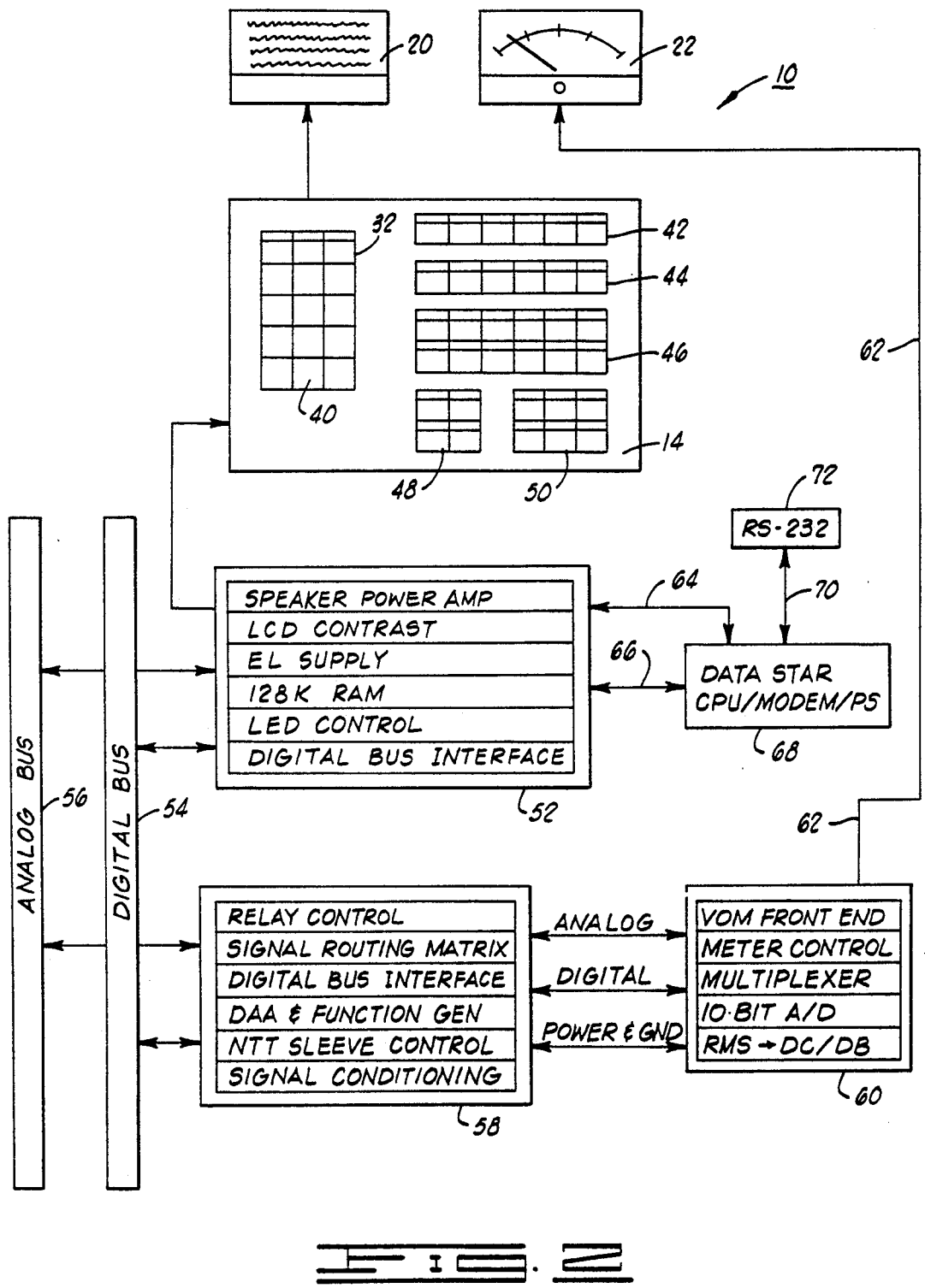
FIG. 2 is a functional block diagram of the line check unit and the interconnection of its various components.

Referring now to FIG. 2, the line check unit 10 is shown to include the front panel 14 plus a controller circuit board 52 that is interconnected via digital bus 54 and analog bus 56 to an analog circuit board 58. The analog circuit board 58 is then further connected via analog, digital and power interconnection to the volt-/ohm meter circuit board 60 having output connection 62 to the volt/ohm meter 22. The line check unit 10 is connected to the telephone line through liens 64 and 66 to the DATASTAR TM unit 68 which then connects to a selected telephone line. The DATASTAR TM 68 is a CMC 7910D terminal that is commercially available from Communications Manufacturing Company of Los Angeles, Calif. The DATASTAR TM 68 is specifically adapted for use with the Technician Access Network (TAN) and it consists of a small handheld, battery-powered, microprocessor-controlled data terminal. The DATASTAR TM terminal is equipped with an internal modem, and an RS-232 connector 72 for serial interface with a DB-9 connector for peripheral devices such as bar code readers, and a TTL logic serial interface port that is compatible with the CMC 7970A printer. The DATASTAR TM terminal 68 includes a keyboard, and a touch-tone keypad is provided for traditional numeric outpulsing in the DTMF (dual tone multi-frequency) mode or ASCII (American Standard Code for Information Interchange) mode. The DATASTAR TM terminal 68 includes resident central processing unit as well as at least 64K random access memory.

The controller circuit board 52 receives interconnection to the DATASTAR TM terminal 68 and includes speaker power amplifier, the LCD contrast and electroluminescence supply circuitry as well as 128K random access memory which functions interactively with the central processing unit within DATASTAR TM terminal 68. Controller board 52 also provides LED control for the front panel indicators as well as provision of a digital bus interface to bus 54, as will be further described below. The analog circuit board 58 includes circuitry for relay control, signal routing, a digital bus interface, circuitry for digital access arrangement, no test trunk control and signal conditioning circuitry, as will be further described below. The volt/ohm meter circuit board 60 provides the various meter control and signal analyzing circuits for driving meter 22 and providing output test indications.

Figure 3:
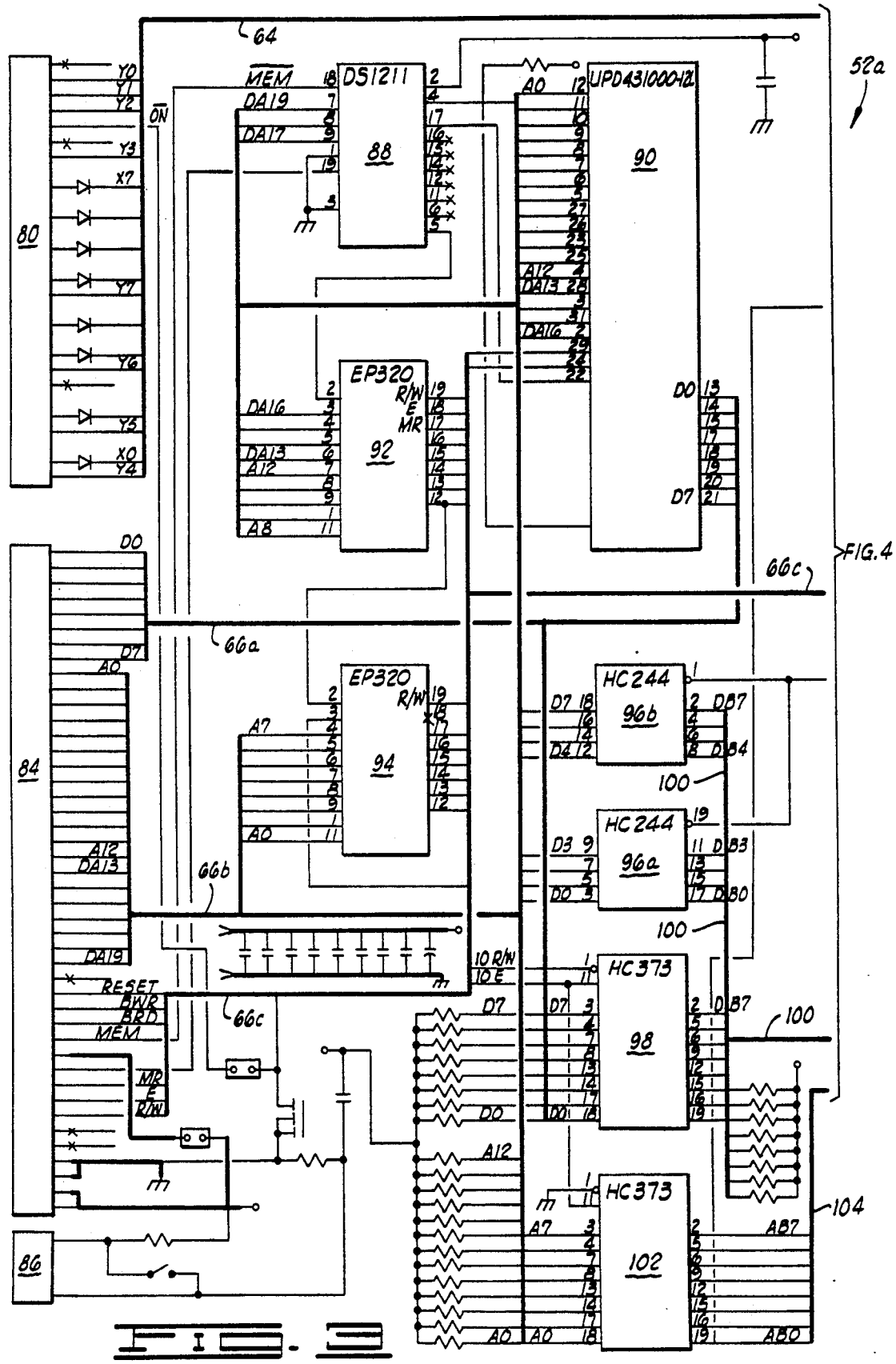
Figure 4:
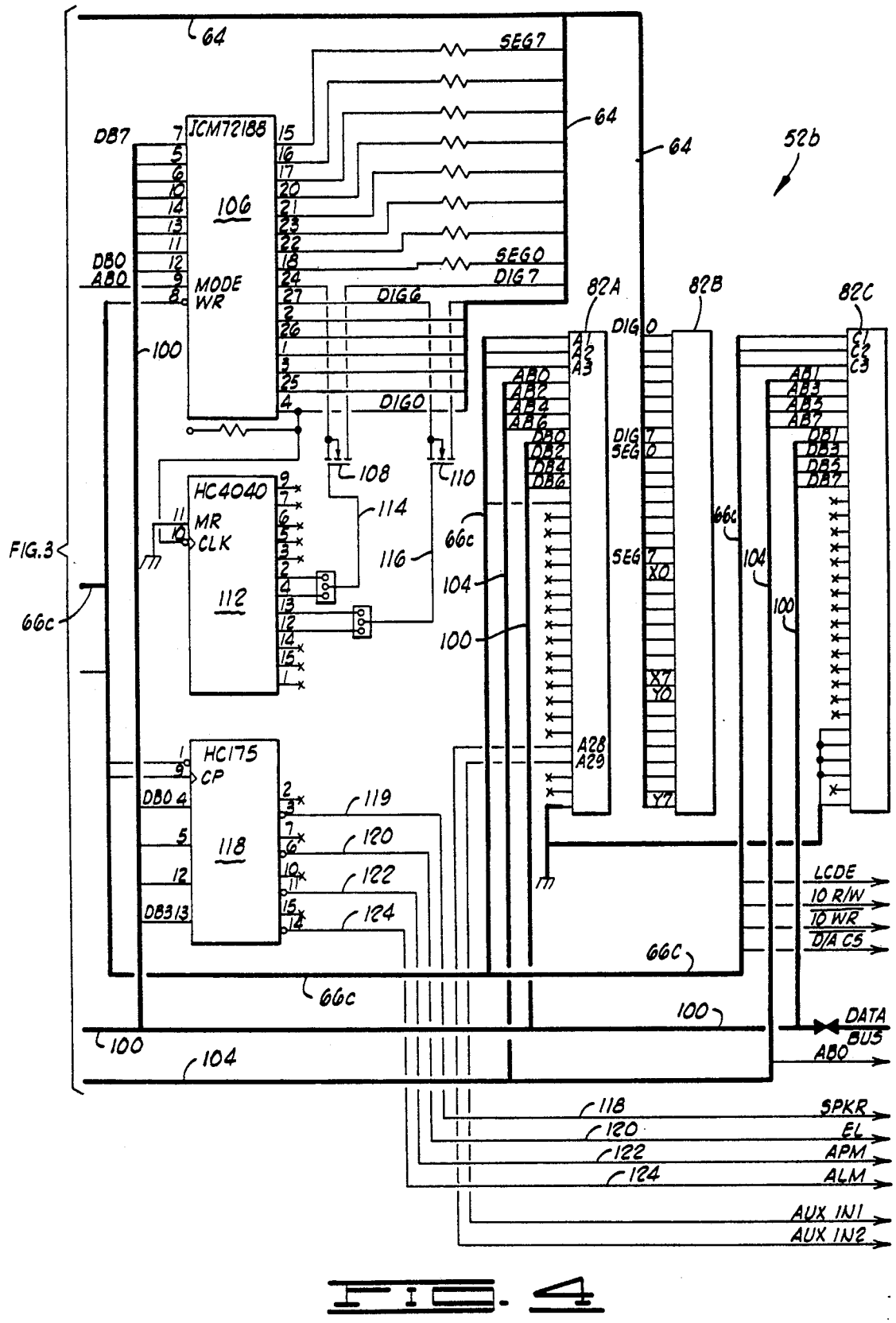

Referring now to FIGS. 3, 4, 5 and 6 there is schematic illustration of the controller circuit board 52a–d. FIGS. 3 and 4 constitute the DATASTAR TM interface bus controller. Referring to FIG. 3, a DATASTAR TM keypad connector 80 provides multi-pin connection for input to the bus 64. Inputs to bus 64 are the 8-bit signals Y0–Y7 and the 8-bit rectified signals X0–X7, and these signals are conducted onto bus 64 to a section 82B of a 32 pin connector Type EC96PRA (FIG. 4). The connector 82B is connected through a mother board to its mating counterpart which connects to the front panel circuitry (not shown) for control of the LED array and switch array. Thus, each of the push button switches in groups 42, 44, 46, 48 and 50 (FIG. 1) has an LED in association therewith to indicate switch condition. Electrically, these switches are arrayed in a matrix formation of column and row conductors wherein X0–X7 conductors coact with Y0–Y7 conductors to indicate a switch closure and the counterpart LED is illuminated between the respective SEG-0–SEG7 and DIG0–DIG7 conductors. Each of connectors 82A, B, C (FIG. 4) connect through a mother board (not shown) for connection to their mating counterparts, as will be described.

A DATASTAR TM memory connector 84 provides input of selected address and information data to the busses 66a–c as well as common connections. A connector 86 provides an external reset connection. Thus, master control is effected by the central processing unit of the DATASTAR TM terminal as all input/output data in the line check unit 10 is mapped into the DATASTAR TM memory. A decoder 88, IC Type DS 1211, sets control and maintains paging of the memory information stored in a static ram 90, Type UPD431000-12L. The memory is maintained in 8K pages as address decoder 88 maintains sequencing of addressing through first and second address decoders 92 and 94, each IC Type EP320. Address decoder 92 functions as the master control when enabled by signal from pin 5 of decoder 88 to provide outputs at pins 12–15 for signaling, respectively, IO requests, not IO read/write, IO read/-write and IO enable. Output from pin 12 then further enables address decoder 94 to generate specific 8-bit address data down to the byte level on lines A0–A7 at pins 11–4, respectively.

Data signals D0–D7 on bus 66a are applied to each of static ram 90, tri-state buffer 96a and 96b, IC Type HC 244, and a data bus driver 98, IC Type HC 373, which also includes latch circuitry. Output from bus driver 98, digital signals DB0–DB7 at respective pins 19-2, goes onto data bus 100. The A0–A7 data on bus 66b is also processed through a data bus driver 102, i.e., for both read and write data, to generate AB0–AB7 8-bit code onto a bus 104 which proceeds to connectors 82A and 82C (FIG. 4).

Referring to FIG. 4, an LED control register 106 receives data DB0–DB7 from data bus 100 to generate the LED matrix selection data. That is, the control register 106, an IC Type ICM 7218B register, actually functions as 8 registers in multiplex to provide the requisite LED selection signals SEG0–SEG7 and DIG-0–DIG7 as they are placed on bus 64 for conduction to connector 82B. The flashers 108 and 100 provide intermittent pulsing of the DIG6 and DIG7 outputs. A 12-bit binary counter 112, CMOS Type HC 4040, provides selected intermittent pulse enable on leads 114 and 116. A four bit data latch 118, IC Type HC 175, receives DB0–DB3 4-bit input to produce respective control outputs 119, 120, 122 and 124 for, respectively, speaker control, electroluminescence control, analog panel meter control and alarm control.

The data bus 100 and bus 104 are connected to each of connectors 82A and 82C to connect selected 4-bit data. Thus, the address bus 100 connects AB0, 2, 4, 6 outputs to connector 82A while data bus 100 connects outputs DB0, 2, 4, 6 to succeeding pins 8-11 of connector 82A. Control outputs from bus 66c are also output as NOT IORQ, IOR/W and NOT IORD and are connected to pins A1-A3 of connector 82A, and NOT WAIT, NOT IOR/W and NOT IOWR are connected to pins C1-C3 of connector 82C.

Referring to FIG. 5, a dual channel D/A convertor 130, IC Type AD 7528, receives data DB0-DB7 from data bus 100 as the same data is also applied (see FIG. 6) to the first 8 contacts of a connector 132B. The D/A convertor 130 produces channel A and channel B analog outputs at respective pins 2 and 20. The channel A output on lead 134, as it is processed through successive OP-AMPS Type LT 1013, provides output on a lead 136 that serves as the LCD contrast adjust. The contrast adjust lead 136 is also connected at contact B12 of the connector 132B. The channel B portion output from convertor 130, pin 20 functions to attenuate the DATASTAR TM terminal audio level across its audio range. Thus, the output signal on lead 136 is summed with auxiliary inputs 1 and 2 from the craftsman's dispatch data terminal in summing op-amp 138 for input to a high power op-amp 140, IC Type LM 1875, which further provides a decoupled output via line 142 for A-C coupling to contact B31 of connector 132B. The speaker plus output is applied to contact B31 and speaker minus output is applied to contact B32 of connector 132B, and a non-latching form 2C relay 144, Type TF2E, provides an anti-pop circuit for protection when the system is first powered up A DC/DC convertor 146 converts −48 volts to ±5 volts for output via lead 148 to respective A1 and C1 contacts of connectors 132A and 132C.

Figure 6:
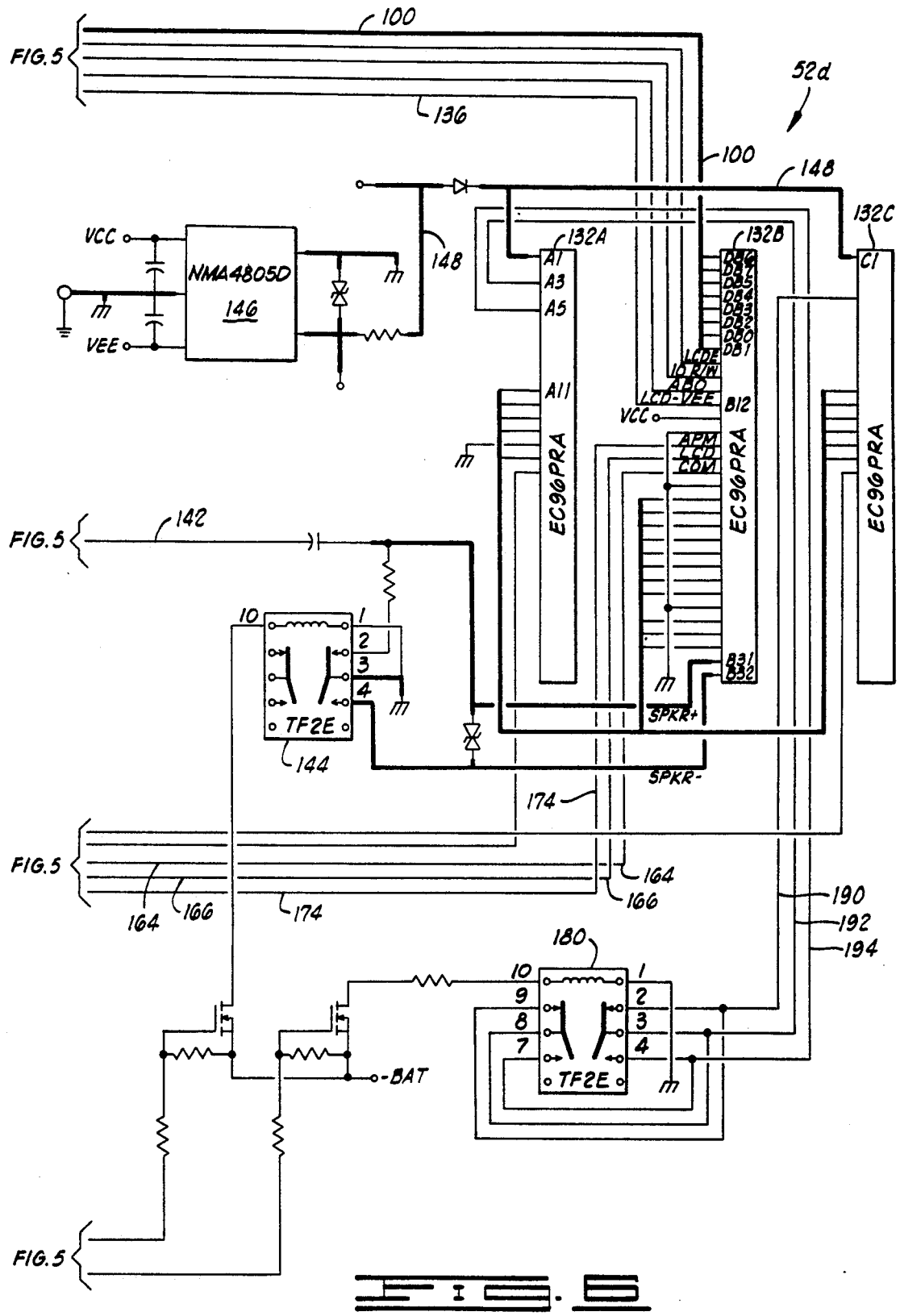

In FIG. 6, the connectors 132A, B and C are a similar type of circuit board connector as connectors 82A, B and C of FIG. 4, i.e., Euroconnector Type EC96PRA. The connectors are three section, multi-contact types functioning through a printed circuit mother board for ultimate connection to their respective mating counterparts, as will also be described in greater detail.

Referring again to FIG. 5, a connector 150 from the DATASTAR TM terminal provides a B channel voltage signal for input at pin 18 of the dual channel D/A convertor 130. Yet another connector 152 from the DATASTAR TM terminal provides DATASTAR TM tip and ring signal on respective leads 154 and 156 and these are connected for output at contact 17 of respective connectors 132C and 132A. A DC/AC convertor 158, Type LPS series, provides output of 400 hertz, 100 volts AC RMS on lead 160 through jumper 162 for selected connection on leads 164, 166. The inputs 120, 122, 119, 124 are applied through an FET network 168 which functions as a level shift and current control device to provide selected outputs through jumpers 170 and 172 to produce control outputs on leads 164, 166 and 174 for application to connector 132B, contacts 15-17 (FIG. 6) to control the analog panel meter, the LCD and common connections, respectively. A relay 180, another type 2F2E, provides ALM control output on respective leads 190, 192 and 194 to designated contacts on connectors 132A and 132C.

Figure 7:
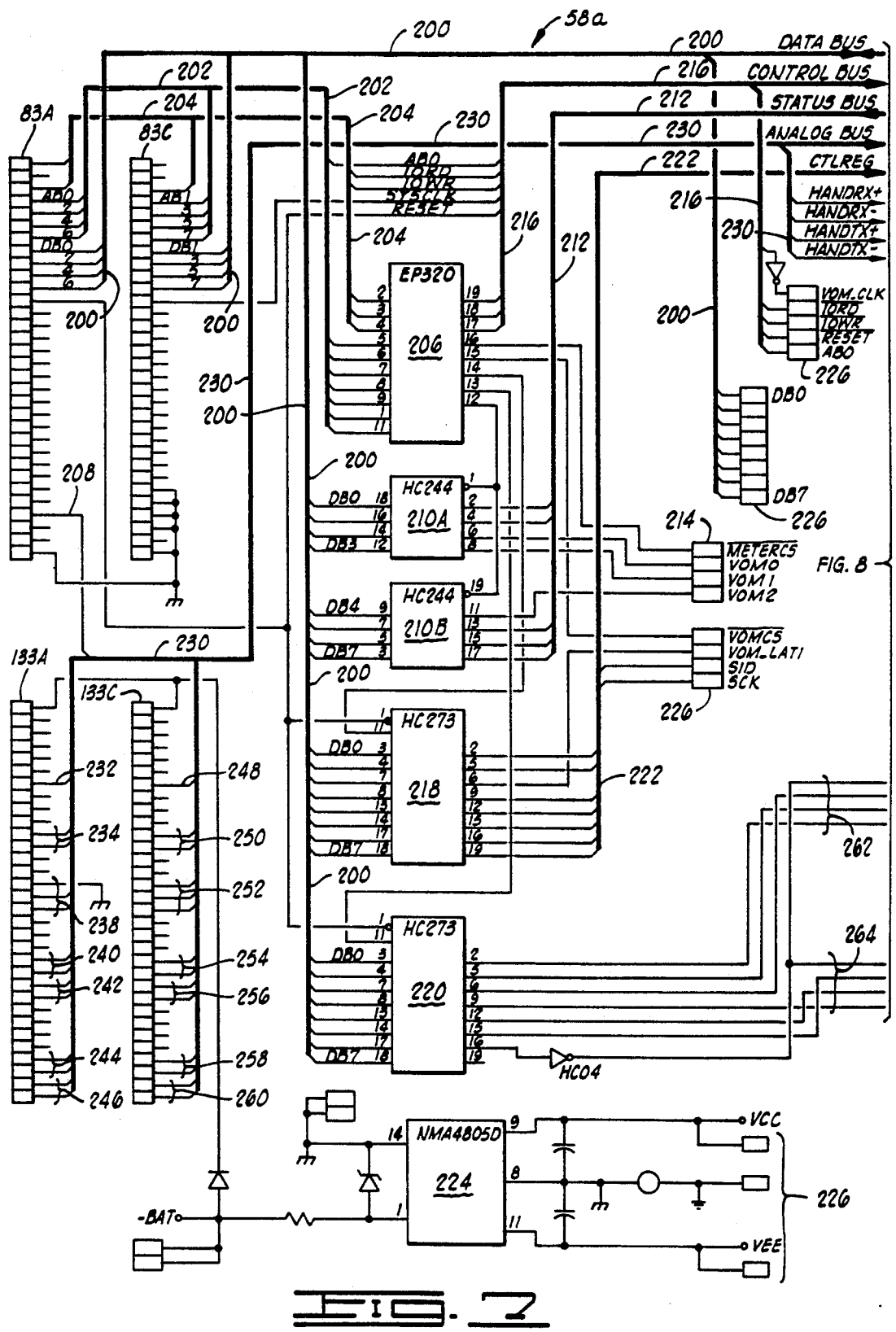

FIGS. 7, 8, 9, 10, and 12 illustrate the parts 58a through 58f of the analog control board of the unit 10. FIG. 7 illustrates the system bus interface and control of the relay matrix. Thus, mating counterpart connectors, digital connectors 83A and 83C and analog connectors 133A and 133C, are shown as they deliver signals from the mother board interconnect.

Leading from connector 83A is a data bus 200, and buses 202 and 204 interconnecting between connectors 83A and 83C and a programmable array logic 206, an IC Type EP 320. The pin connections A1 through A12 of connector 83A are respectively NOT IORQ, VOID, NOT IORD, AB0, AB2, AB4, AB6, DB0, DB2, DB4, DB6 and RESET. Pin 29 is AUX IN1 on lead 208. In like manner, connector 83C at contacts C1 through C12 are, respectively, VOID, NOT IOWR, AB1, AB3, AB5, AB7, DB1, DB3, DB5, DB7 and SYSCLK. These outputs feed variously through the digital busses 200-204 and into the array logic 206 as AB1 through AB7 are input to pins no. 11-5 and pins 2, 3 and 4 receive NOT IORQ, NOT IORD and NOT IOWR, respectively. Connects at programmable array logic 206 via pins 12-19 are as follows: NOT STATUS, NOT RLYWR, NOT CLTREG, NOT METRCS, NOT YN3812, NOT TXRXCS, and NOT DAACS. From data bus 200 the DB0-DB3 and DB4-DB7 are input to data buffers 210a and 210b while providing outputs on status bus 212 as well as to connectors 214. Pins 17, 18 and 19 of array logic 206 provide output on control bus 216. Data bus 200 also provides inputs of DB0-DB7 to pins 3-18 of each of the latching control registers 218 and 220, each IC Type HC 273. Outputs from register 218 are then placed on bus 222, the control register bus. Outputs from the control register 220, from pins 2-19 are utilized to control the matrix of function relays, as will be further described below.

A DC to DC convertor 224, IC Type NMA 4805D, generates positive and negative output voltage for connection to selected contacts of a connector 226. It should be understood that in FIGS. 7 and 8, the contacts for connectors 214 and 226 are shown separated, they are actually in a single connector alignment in the manner of conventional printed circuit board connectors, but shown segmented for drawing clarity.

The analog connector sections 133A and 133C provide input to an analog bus 230. The connector 133A taps a number of connections from its associated mother board among which are the test tip output on lead 232, the handset receive and transmit signals RX+ and TX+ at 234, external ring and DATASTAR TM ring at 238, POTS 2 tip and POTS 1 tip at 240 (POTS is plain old telephone service), shoe tip 1 and shoe tip at 242 and NO TEST trunk 2 (NTT) ground and tip at 244 and NO TEST trunk 1 (NTT) ground and tip at 246. The output connector 133C taps similar signals from the mother board except that they are the opposite mating signals for those of connector 133A. Thus, test ring is tapped off at 248, handset receive and transmit negative at leads 250, external ground and external and DATASTAR TM tip at lead group 252, POTS 1 and 2 ring leads 254, shoe 1 and 2 ring leads 256, no test trunk 2 sleeve and ring at lead 258 and no test trunk 1 sleeve and ring at leads 260.

Figure 8:
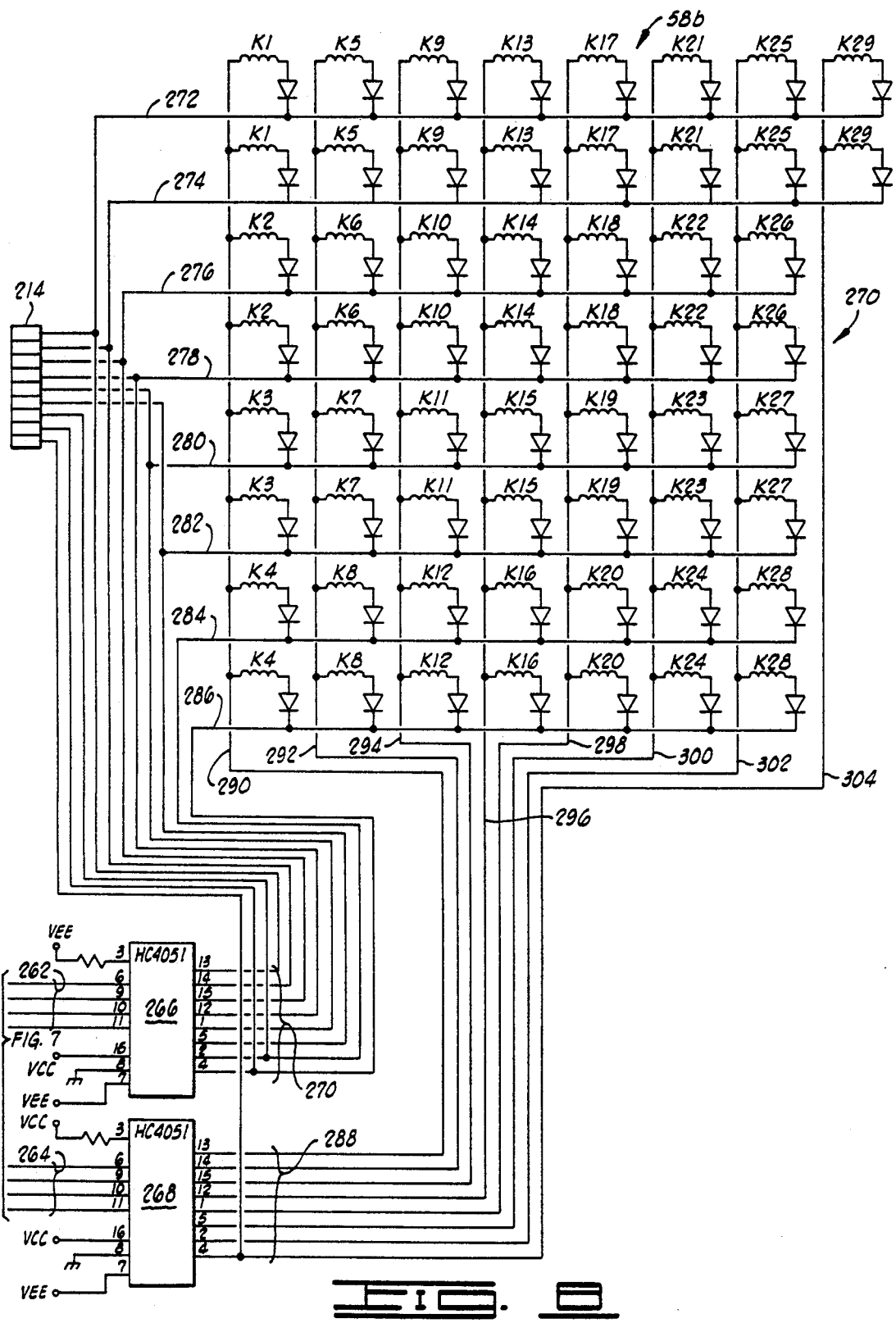

The output from pins 2-16 of data latch 220 is divided into two groups of four leads 262 and 264 for controlling the analog switches in FIG. 8. Thus, each of the analog switches 266 and 268 is an 8:1 multiplexer, IC Type HC 4051, that provides 8 outputs, respectively, for control of the relay matrix 270, an 8×8 matrix of 64 relay coils, albeit not all of them are used. The eight outputs from multiplexer switch 266 on leads 270 are applied to the horizontal row conductors 272-286, and eight leads 288 output from analog switch 268 are applied to respective vertical column conductors 290-304.

Figure 10:
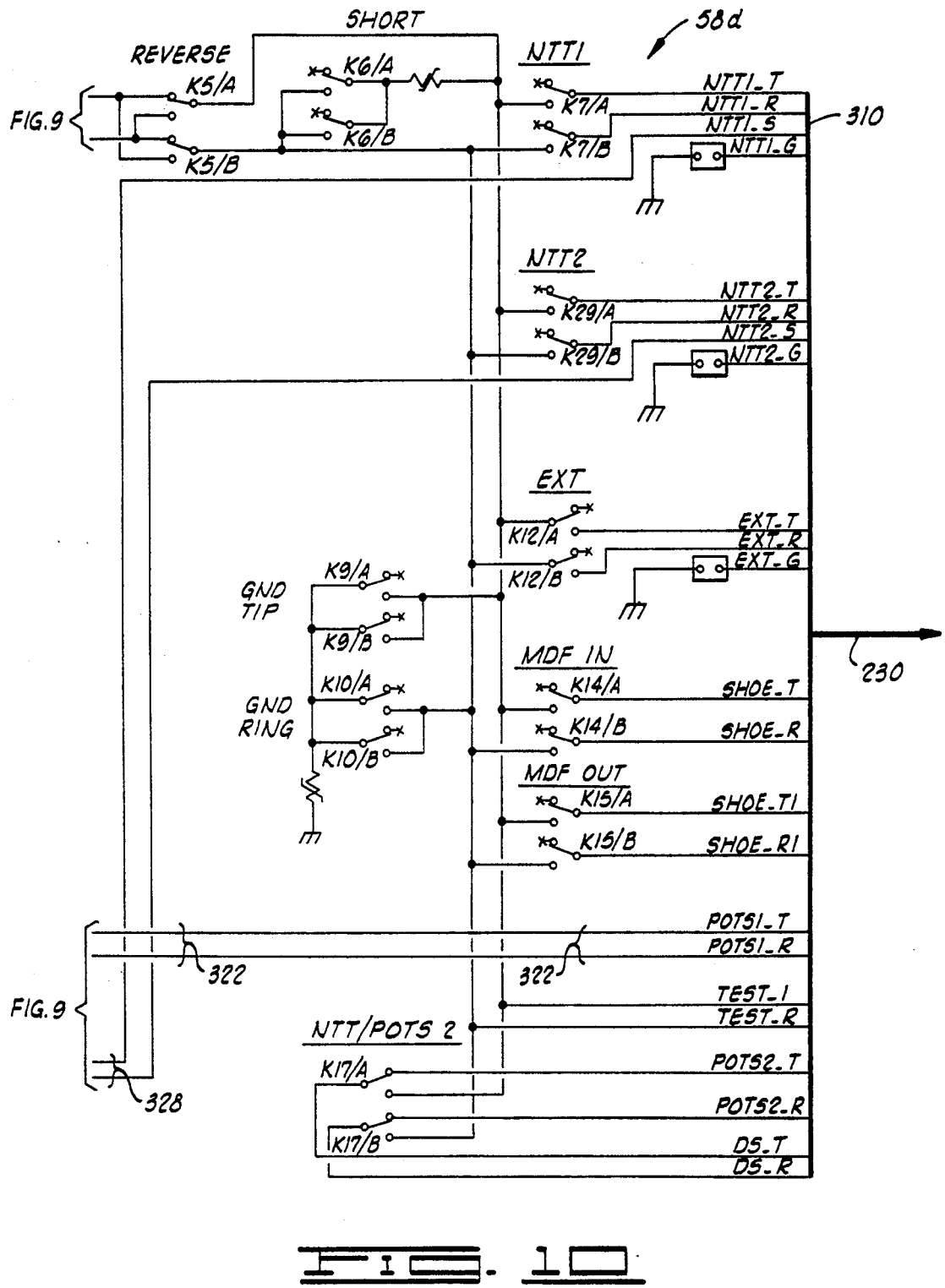

FIGS. 9 and 10 show the actual contacts for the matrix of relays 270 (FIG. 8) as they are laid out in logical switching relationship. Referring first to FIG. 10, analog bus 230 conveys analog test information for input to the logic switching system. The NO TEST TRUNK data (NTT) is input at lead group 310 and NO TEST TRUNK 1 select is made by relay K7 and SHORT and REVERSE testing is then brought about by respective relays K6 and K5. In FIG. 9, relay K3 selects a TEST ORIENTATION as between volt/ohm meter and ring generator, as relays K1 and K2 control the volt/ohm meter and relay K8 outputs RING or TONE. Parallel leads 312 convey the no test trunk data down to relay K11 to select data access arrangement (DAA) and to relay K13 to the no test trunk monitor. Lead pair 314 provides tip and ring output to the volt/ohm meter. It is also used in the KICK test or capacitive reaction indication. Leads 316 provide a ring/tone generator output while leads 318 provide no test trunk data access arrangement output and leads 320 provide data for the no test trunk monitor. Basic test selection is made by the select relays K7, K29, K12, K14, K15 and K17 (FIG. 10) as these relays select for test, respectively, NO TEST TRUNK 1, NO TEST TRUNK 2, EXTERNAL, MDF IN, MDF OUT, and NO TEST TRUNK/POTS 2 selection.

The POTS 1 tip and ring present on lead pair 322 is subject to data access arrangement at relay K16 and the POTS hold circuit 324 with output provided on tip and ring lead pair 326. No test turn (NTT) sleeve voltage present on leads 328 (FIG. 10) is tested by selection of sleeve at relay K28, level select at relay K19 and polarity select at relay K18 with output voltages appearing on leads 330. A SLEEVE SENSE output indication is present on parallel lead 332 while relays K18/B, K19/B and K20/B provide output indication to the status bus 212.

Figure 11:
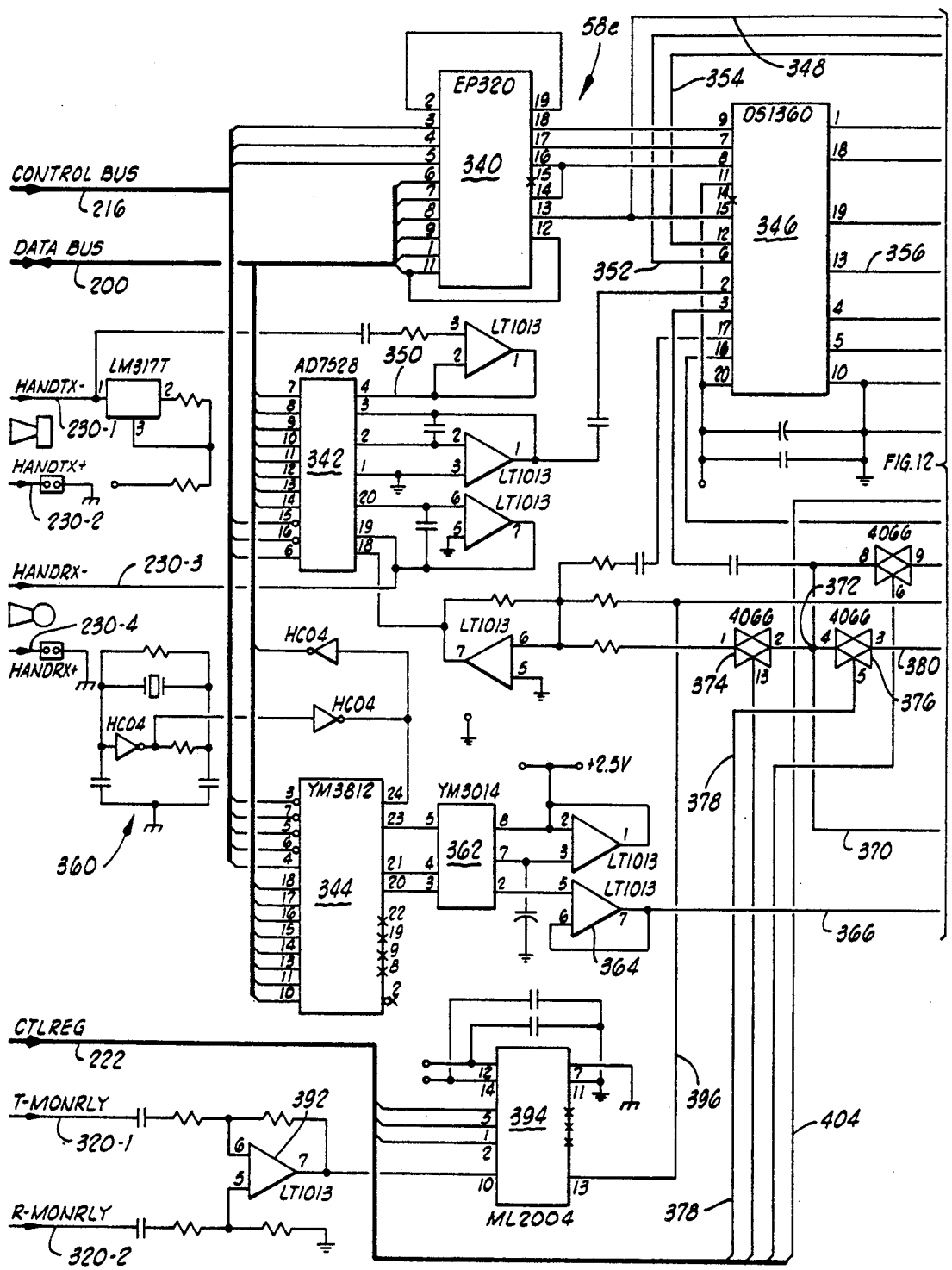
Figure 12:
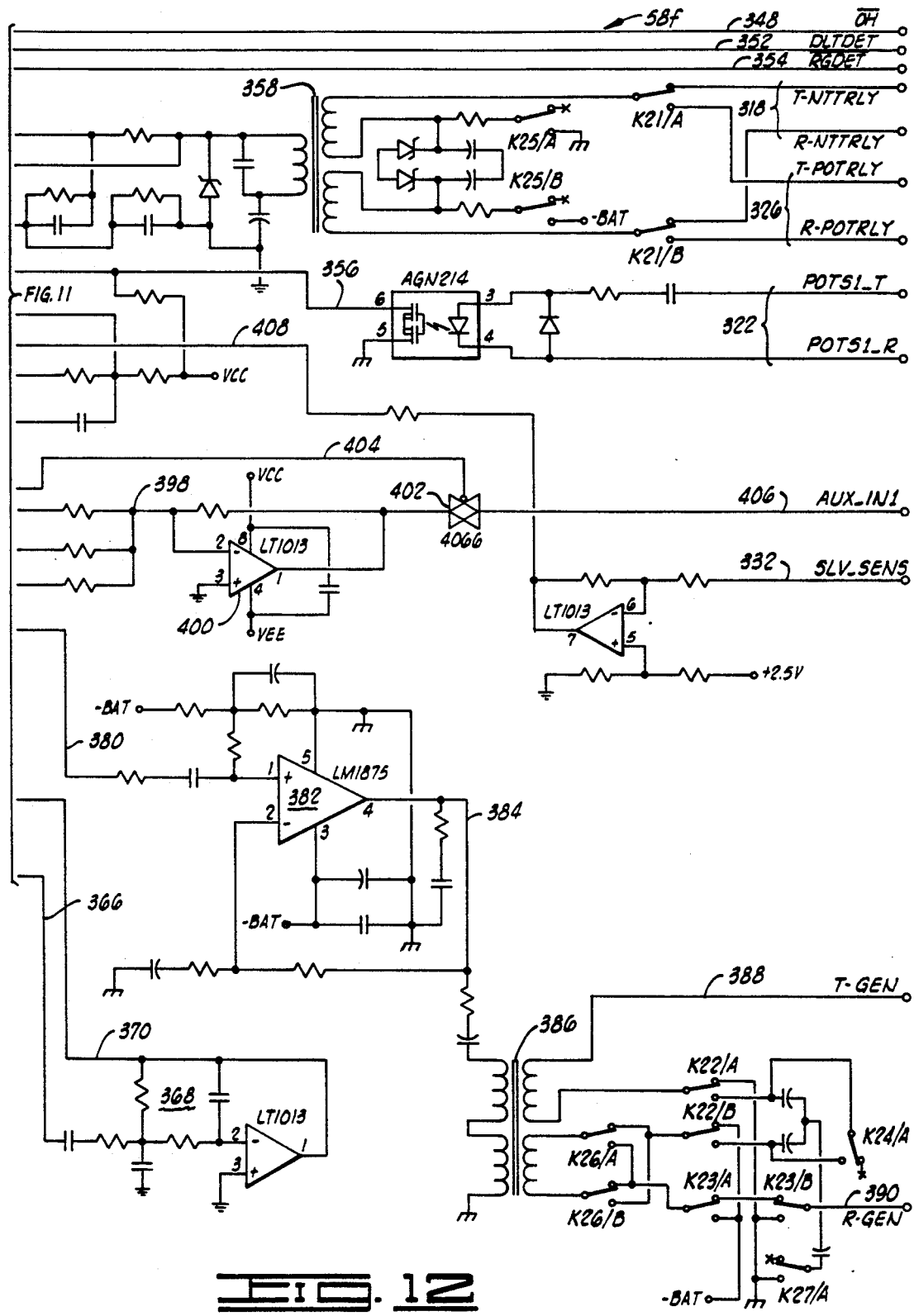

Referring now to FIGS. 11 and 12, the last two sections 58e and 58f of the analog board are illustrated. Noting the various leads on the left side of FIG. 11, the control bus 216 supplies connection to each of a programmable array logic 340, IC Type EP 320, a digital to analog gain control 342, IC Type AD 7528, and a 9 channel synthesizer 344, IC Type YM 3812. Control bus 216 supplies NOT DAACS, NOT IOWR and NOT IORD to pins 3, 4 and 5 of array logic 340, and it supplies signal TXRXCS, NOT IOWR and ABO to pins 15, 16 and 6 of gain control stage 342. Also, control bus 216 supplies connections of RESET, NOT YM3812, NOT IOWR, NOT IORD and ABO to pins 3, 7, 5, 6 and 4, respectively, of the synthesizer stage 344. The data bus 200 supplies DB0-DB5 inputs to array logic stage 340, DB0-DB7 to pins 14-7 of gain control stage 342 and DB0-DB7 at pins 10-18 of synthesizer 344. The array logic 340 provides as a special purpose latch for a data access arranger (DAA) 346 which functions interactively as a system modem. The data access arranger 346 is enabled and clocked from the array logic 340 and NOT OH signal from the no test trunk hold circuit (FIG. 9) is received in (FIG. 12) on a lead 348 for input at pin 15 of data access arranger 346. The arranger 346 includes a delta detector integral in the IC circuitry, and in response to a DOTSET signal input on lead 350 it produces a DLT DET output on lead 352. Also, an RGDET output is produced at pin 12 and on line 354. Ring sensor signal present on a lead 356 is input at pin 13 of arranger 346 and this, in turn, produces the monitored ring detector output at pin 12 on lead 354. The transformer 358 receives tip and ring signal of either no test trunk on leads 318 or POTS on leads 326, depending upon energization of relay K21.

An oscillator 360 providing output at 3.1597 megahertz clocks into pin 24 of synthesizer 344 and the synthesizer output works into digital to analog convertor 362, IC Type YM 3014. A synthesized analog output is present from op-amp 364 on lead 366 where it is supplied through a low pass butterworth filter network 368 to produce an output with 10 kilohertz corner on op-amp lead 370 for return to a junction 372 between analog switches 374 and 376 The analog switch 376 is then triggered by SYNGEN output from the CTLREG bus 222 via lead 378 and the synthetic analog signal is conducted via lead 380 for input to the power op-amp 382, the ring generator circuit. Output on line 384 through transformer 386 produces a 20 hertz signal at 90 volts RMS on lead 388 (T-GEN) and a selected R-GEN output on lead 390. Referring again to FIG. 11, tip and ring monitor relay signals on leads 320-1 and 320-2 (from FIG. 9) are differentially amplified in op-amp 392 with the output being applied to pin 10 of a serial program gain controller 394, IC Type ML 2004, which functions as a monitor gain attenuator with output from pin 13 being applied via lead 396 to a junction 398 (FIG. 12) at the input of summing op-amp 400. Thus, when analog switch 402 is triggered by AUX1 EN signal on line 404, the summed signal from pin 16 of the data access arranger 346 and the output 396 of gain controller 394 is present on lead 406. SLEEVE SENSE input on lead 332, as derived in FIG. 9 from sleeve relay K28/A, is input via lead 408 to pin 5 of the data access arranger 346. This voltage sense input at pin 5 is internally processed through an 8-bit A/D convertor and subsequent delta detector to generate the DLT DET output at pin 6 on lead 352.

Figure 13:
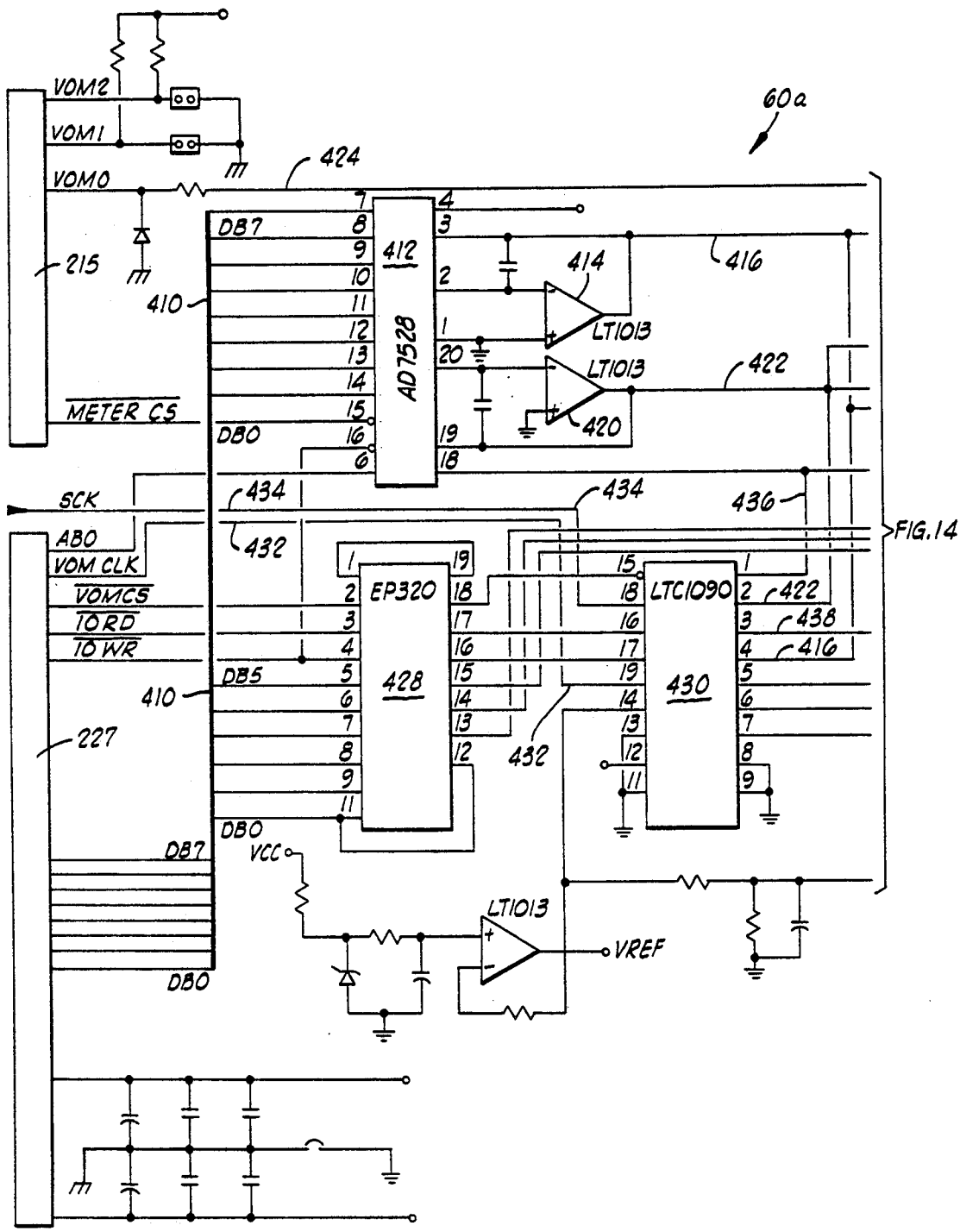
FIGS. 13, 14, 15 and 16 are the interconnected schematic diagram of the volt/ohm meter circuit board.

Referring now to FIGS. 13, 14, 15 and 16 there is illustrated the volt/ohm meter circuit board 60a-d. In FIG. 13, the connector 215 is a direct mating connector to connector 214 in FIG. 7, and connector 227 is a direct mating connector to connector 226 of FIG. 7. These connectors do not go through the mother board. Eight-bit digital data DB0-DB7 is taken form connector 227 and placed for distribution on a data bus 410. Thus, DB0-DB7 digital signal is applied on respective pins 14-7 of an eight input, dual channel digital to analog convertor 412, IC Type AD 7528, which functions as a dual channel attenuator. Channel A output on pin 2 is input to op-amp 414 where it is locked to a pre-set reference and output is on lead 416 (FIG. 14) to op-amp comparator 418. In like manner, the channel B output from pin 20 is input to an op-amp 420 with output on lead 422 to comparator 418, and the compared voltage on output 424 is supplied back to the connector 215 as the VOM0 voltage. The lead 422 is extended on to a portion of connector 215 where it functions as the minus meter voltage. A diode 425 and lead 426 (FIG. 14) to connector 215 provide the plus meter connection.

Figure 14:
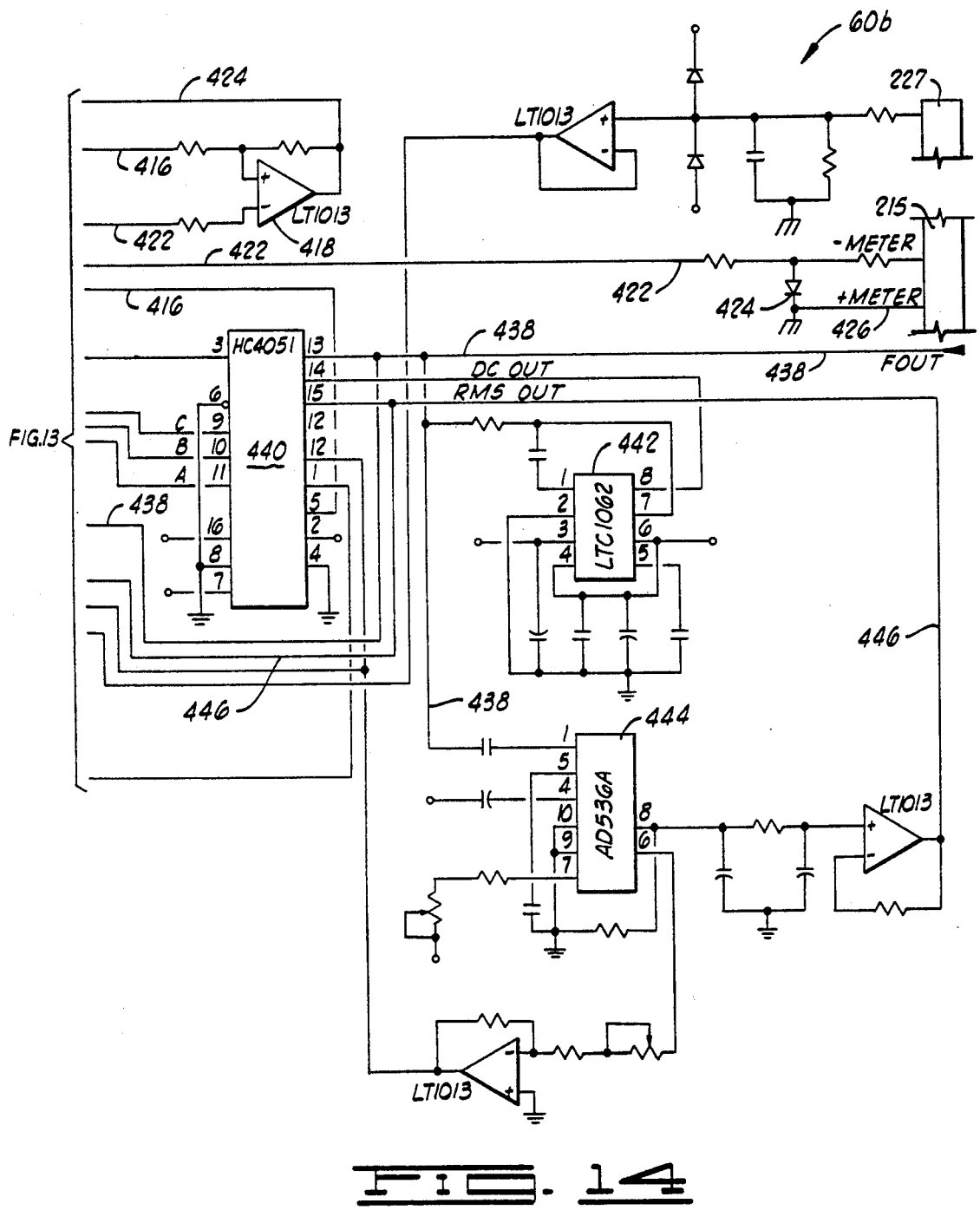

Data signals DB0-DB5 from bus 410 are also applied onto pins 11-5 of a logic circuit 428, a CMOS programmable array logic of IC Type EP 320. An 8:1 analog to digital convertor 430, IC Type LTC 1090, receives data input at pin 17, VOM clock on lead 432 to pin 19, the A clock input, and S clock input on lead 434 to pin 18. A multiplex out put from pin on lead 436 provides a voltage reference input at pin 18 of convertor 412 as well as to pin 3 of an analog selector 440. A METER output from pin 2 on lead 422 is the minus meter lead. An F out signal from pin 3 on lead 438 then leads to pin 13 of an 8:1 analog selector 440, IC Type HC 4051 (FIG. 14). A stage 442 constitutes a ten hertz low pass filter which is employed for DC meter measurement as DC out is returned to pin 14 of analog selector 440. A DC convertor 444, IC Type AD 536A, provides an AC measurement output in RMS value at pin 8 in response to FOUT input at pin 1 while pin 6 provides a logarithmic output of the AC value thereby to enable a decibel indication. The analog meter functions in real time such that it can show a time varying value thereby enabling more complete analysis.

Figure 15:
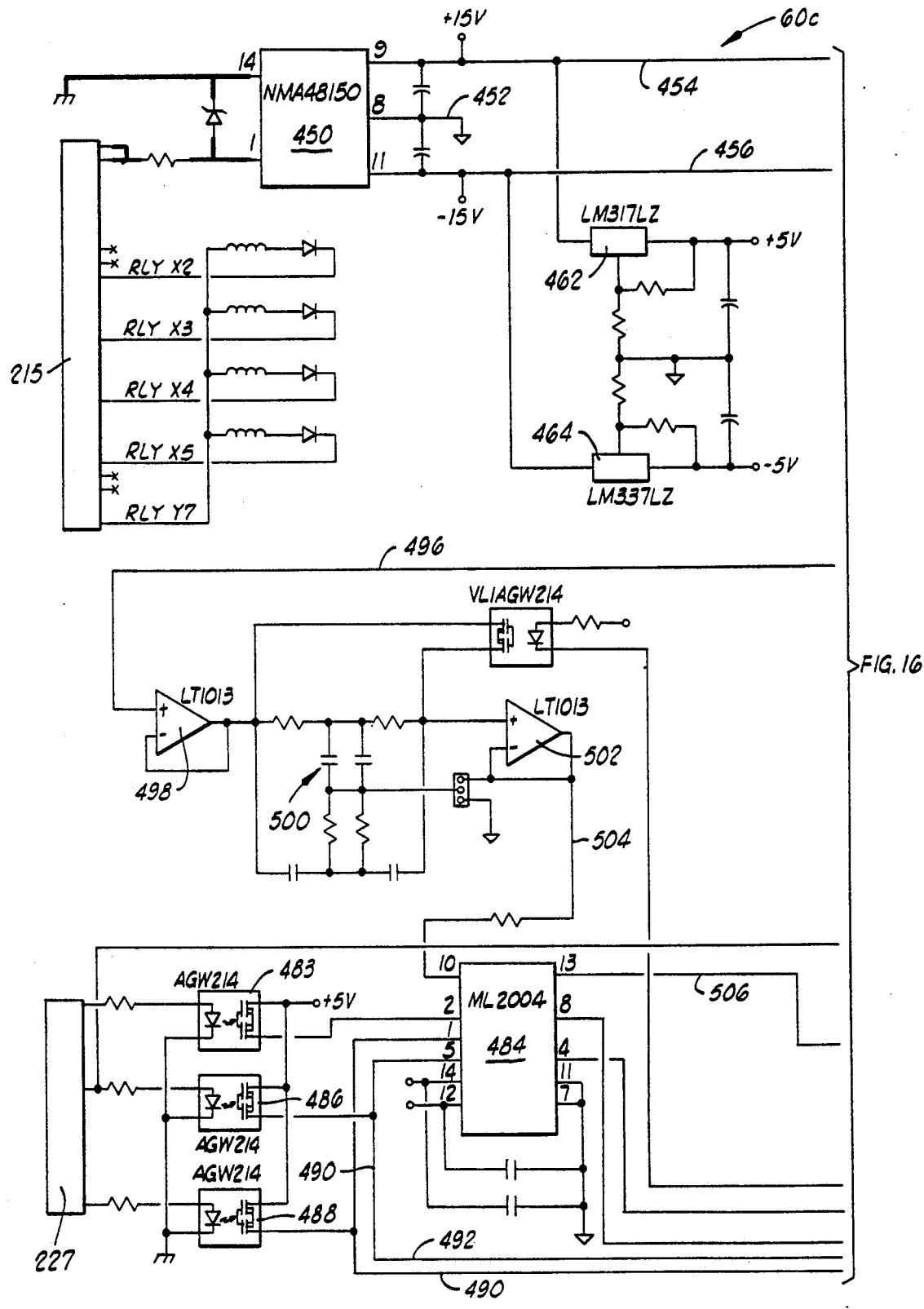
Figure 16:
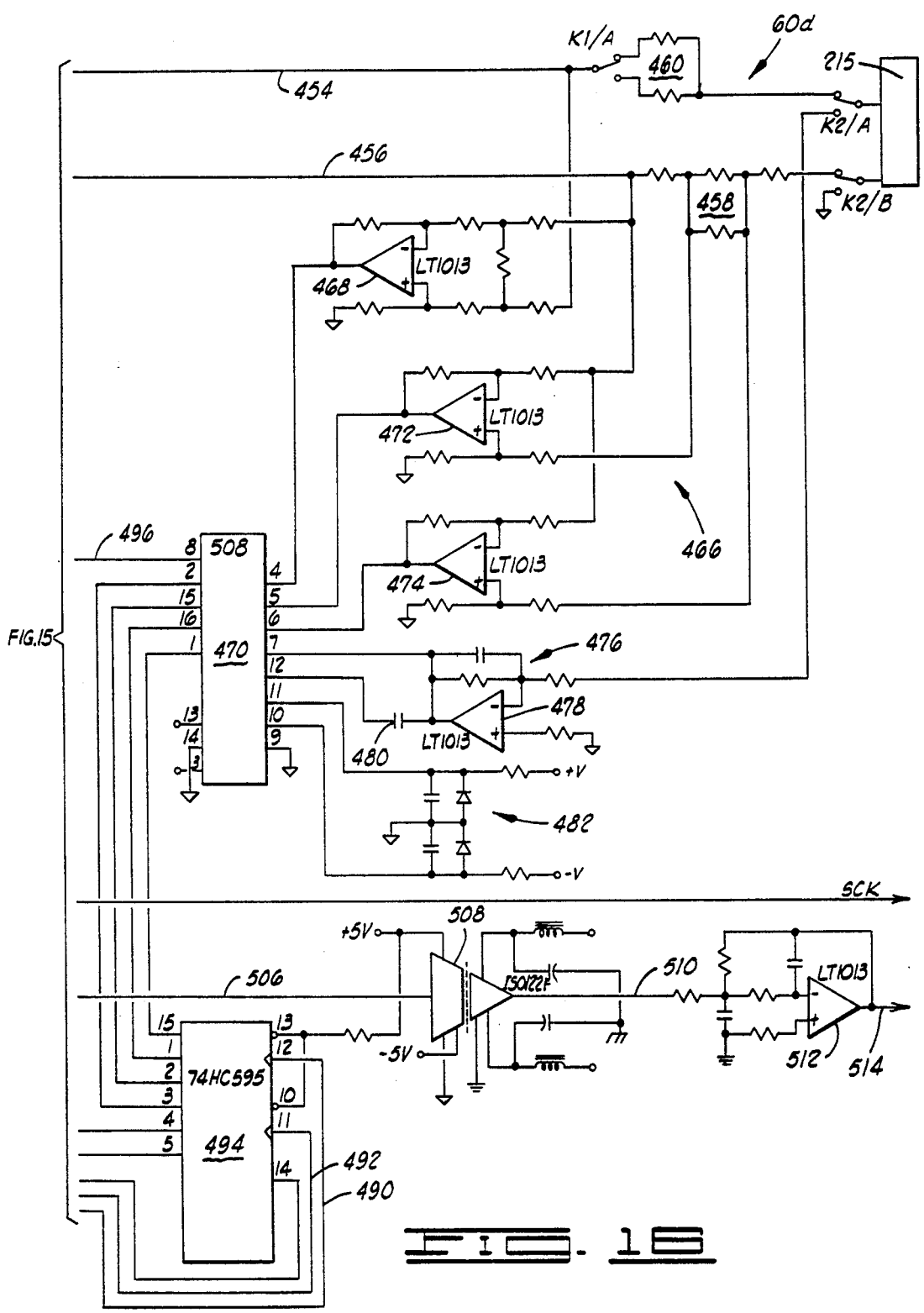

Referring now to FIG. 15, a DC/DC convertor 450, IC Type NMA 48150, is connected to provide plus and minus 15 volts relative to an isolated ground 452. It may be noted that all of the circuitry of FIGS. 15 and 16 is floating at isolated ground relative to the rest of the system circuitry Thus, the ±15 volts on leads 454 and 456 serve as the ohm meter bias supply. The +15 volt lead 454 proceeds on to FIG. 16 and, under control of relays K1/A and K2/A, is placed on connector 215 as +VOMRLY signal. In like manner, lead 456 carrying −15 volt potential proceeds through series/parallel precision resistor network 458 and relay K2/B to connector 215 as −VOMRLY signal. A high value resistance network 460 can simulate the kick type of meter test as controlled by relay K1. A pair of voltage regulators 462 and 464 (FIG. 15) are connected across the 15 volt supply to provide further regulated plus and minus 5 volt outputs.

The voltage divider network 466 (FIG. 16) functions such that op-amp 468 provides ISOSPLY input to pin 4 of an 8:1 demultiplexer 470 IC Type 508. In similar manner, op-amp 472 provides a X100 input to pin 5 while op-amp 474 provides an X1000 control at pin 6. The resistor-capacitor network 476 and op-amp 478 connect a ÷100 DC input at pin 7 while connection through capacitor 480 to the pin 12 provides a ÷100 AC capability. The network 482 provides plus and minus reference voltage inputs to the multiplexer 470.

Connector 227 (FIG. 15) provides serial input data (SID) through opto-isolator 483 functioning as an analog switch for input on pin 2 of a serially programmable gain attenuator 484, IC Type ML 2004. Similarly, from connector 227 there is serial data clock signal SCK applied through analog switch 486 to lead 492 and pin 5 of attenuator 484, and a latch signal VOM LATI is input through analog switch 488 to pin 1 via lead 490. The leads 490 and 492 from respective pins 1 and 5 are also connected to pins 12 and 11 of a CMOS serial shift register 494, IC Type 74HC595 (FIG. 16). Output from pins 15, 1, 2 and 3 of shift register 494 is then input to the 8:1 demultiplexer 470 at pins 1, 16, 15 and 2. Output from demultiplexer 470 on pin 8 lead 496 is applied to an op-amp 498 (FIG. 15) that is connected as a 60 hertz notch filter as employed with R/C network 500 and op-amp 502. The filtered output on lead 504 is then applied as input at pin 10, the V IN port, of gain attenuator 484 and the signal is attenuated by ±24dB. The output on pin 13 and line 506 is applied (see FIG. 16) to an electrically isolated op-amp 508. Op-amp 508 is isolated from analog ground and has a gain equal to 1 as it provides output on lead 510 through an op-amp 512 onto output lead 514. The op-amp 512 is connected as a second order low pass butterworth filter having a 10K corner cut off.

The line check apparatus of the present invention has the capability for basic volt meter testing, basic ohm meter (resistance testing), capacitance testing (interpretative kick test), operator selectable test direction, basic two-wire dial/talk and monitor functions. In addition, there is LCD display of dialed digits that allows outpulsing manually from the keypad in any of dual tone multi-frequency (2/8), multi-frequency (2/6) or dial pulse (10 pps), and the system may have last number redial capability. There is also the ability for test trunk seizure and signalling, the drawing of dial tone, a talk battery supply, a talk and monitor circuit, and a ring generator that is either balanced or unbalanced and selectable as such. The equipment has a monitor amplifier loud speaker as well as the ability to generate tracing tone and to check for pair I.D. continuity and loop condition.

Loop test functions can be selected by simply pressing the appropriate push button switch on the line check unit's front panel. All voltage measurements are performed and input to the meter will be via test shoe interface or from the test connector bus. Similarly, all resistance measurements can be performed as the input to the meter will be via test shoe interface or from the test connector bus. The line check unit permits the tester or craft person to hold the spring-loaded "OHMS" key down while switching the "REVERSING" key and observing the meter which indicates the capacitive kick. Also, the operator has the capability of selecting the test direction, i.e., the unit permits the operator to look into the office and draw a dial tone or bridge the line, or to look out of the office towards the subscriber. This feature is applicable to both the test shoe circuit and the no test trunk. The basic two-wire dial/talk and monitor functions are applicable in two modes, either (1) through the hard-wired telephone line termination circuit or (2) through the test shoe interface circuit.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A special purpose telephone line checking system for use with such as a hand-held data terminal interconnected to selected subscriber lines, said data terminal having a central processing unit, random access memory and modem, the system comprising:
   digital controller circuit means including random access memory connected to said data terminal and having all input/output from the controller random access memory, interactively mapped through the data terminal random access memory;
   analog circuit means connected via analog and digital busses to said digital controller circuit means and including relay control and relay matrix for routing selected test signals;
   a volt/ohm meter; and
   meter control means including digital to analog convertor for converting test signal and driving said meter with selected analog test signals.

2. A system as set forth in claim 1 wherein said digital controller circuit means further comprises:
   connector means receiving digital data from the external data terminal for input to the digital controller circuit means;

a static ram and address decoder means receiving the digital data input;

buffer means and bus driver receiving digital signal input from said static ram and producing eight-bit digital data for output distribution on a data bus;

a two channel digital to analog convertor means receiving said eight-bit digital data to produce both a liquid crystal display output voltage and a speaker amplifier control voltage; and means routing the data bus onto said digital bus to said analog circuit means.

3. A system as set forth in claim 2 which is further characterized to include:

a cabinet housing said digital controller and analog circuit means and having a front panel;

a plurality of LED indicators located on said front panel, said indicators being arranged in a matrix connection of row and column leads; and an eight-by-eight multiplexer connected to receive input of said eight-bit digital data to produce output for connection to selected row and column leads thereby to energize selected LED indicators.

4. A system as set forth in claim 2 which is further characterized to include:

a data latch means receiving an eight-bit digital signal from said data bus to produce first and second groups of control signals for relay selection;

a matrix of plural relays connected for row lead and column lead selective energization;

first analog switch means receiving the first group of control signals to energize selected row leads; and second analog switch means receiving the second group of control signals to energize selected column leads.

5. A system as set forth in claim 4 wherein:

each of said plural relays in said matrix has double pole, single throw relay contacts; and selected relays in said matrix are actuatable to connect specific line test signals from the analog bus to selected circuit functions.

6. A system as set forth in claim 5 wherein:

said selected relays function to access one of a telephone lien (POTSI), a no test trunk (NTT) trunk, and a main distribution frame (MDF).

7. A system as set forth in claim 5 wherein:

selected relays function to test tip and ring conditions as well as ground tip and ground ring and sleeve condition of NO TEST TRUNK.

8. A system as set forth in claim 1 wherein said meter control means is further characterized to include:

relay means receiving said test signals for selective conduction to one of a resistance circuit and a voltage circuit to produce a plurality of measurement outputs; and an analog selector means for selecting one of said measurement outputs for energizing said meter.

9. A system as set forth in claim 8 which is further characterized to include:

analog-to-digital converter means receiving said plurality of measurement outputs and producing a digital output; and a dual channel digital-to-analog converter means controlled by input from said digital output to provide a meter voltage offset control and a meter voltage comparator.

10. A system as set forth in claim 8 which is further characterized to include:

a demultiplexer means receiving said plurality of measurement outputs from the relay means to select a single test output; and means in ground isolation for amplifying and filtering said single test output to produce said one of said measurement outputs for input to said analog selector means.

11. A system as set forth in claim 1 wherein said meter control means comprises:

relay means receiving said test signals for conduction to one of a resistance network and voltage network to produce a subsequent plurality of measurement outputs;

an analog demultiplexer receiving said plurality of measurement outputs and operable to select a single test output;

a serial shift register producing four-bit output for input to operate said analog multiplexer thereby to produce said single test output;

means for amplifying and filtering said single test output to produce a filtered meter output;

a meter multiplexer receiving said filtered meter output as one input selectable for meter test output signal under control of a three-bit digital signal;

a control register connected to said data bus and producing said three-bit digital signal; and means applying said meter test output signal to said meter.

* * * * *

UNITED STATES PATENT AND TRADEMARK OFFICE
CERTIFICATE OF CORRECTION

PATENT NO. : 5,235,629
DATED : August 10, 1993
INVENTOR(S) : Myron C. Butler, et al.

It is certified that error appears in the above-indentified patent and that said Letters Patent is hereby corrected as shown below:

Column 1, line 29, insert --grounds as each systems represent a typical investment of about-- between "economic" and "$30,000";

Column 3, line 25, delete "liens" and substitute --lines-- therefor;

Column 5, line 64, insert --11-- between "10," and "and";

Column 8, line 67, insert --1-- between "pin" and "on"; and

Column 11, line 43 (line 3 of claim 6), delete "lien" and substitute --line-- therefor.

Signed and Sealed this

Fifth Day of April, 1994

Attest:

BRUCE LEHMAN

*Attesting Officer*    *Commissioner of Patents and Trademarks*